United States Patent Office 2,806,064
Patented Sept. 10, 1957

2,806,064

PRODUCTION OF ANHYDROUS KETENES

John R. McKlveen, Corpus Christi, Tex., assignor to Celanese Corporation of America, New York, N. Y., a corporation of Delaware No Drawing. Application February 23, 1954,
Serial No. 412,123

11 Claims. (Cl. 260—585.5)

This invention relates to ketenes and relates more particularly to the production of substantially anhydrous ketene.

One method which has been employed for the production of ketene has involved the pyrolysis of acetic acid or of other organic compounds, e. g. acetic anhydride, which decompose to form ketene and water. In many cases it is desirable to separate substantially completely the water of reaction from the ketene produced according to this reaction. For example, when the ketene is to be used for a subsequent reaction in the presence of a Friedel-Crafts catalyst, e. g. in a reaction with formaldehyde in the presence of zinc chloride to produce beta-propiolactone, the ketene should be substantially anhydrous because the presence of water causes the formation of undesirable by-products and consequently a reduction in the yield of the desired product. Accordingly, it has been customary in the laboratory to treat aqueous ketene-containing mixtures by cooling said mixtures to temperatures below the boiling point of ketene, which is —46° C., so that the ketene is liquefied and most of the water separates therefrom in the form of ice particles which can be removed in any desired manner. Thereafter the liquefied ketene is subjected to simple distillation to separate any dissolved water therefrom. However, it is not practical to use this laboratory process on a commercial scale because of the high cost of liquefying the ketene. Commercially, a large proportion of the water may be removed relatively simply and cheaply by cooling the ketene-containing mixture merely to a temperature below the dew point of the water vapor therein, whereupon water condenses out of said mixture, but this operation does not yield a substantially anhydrous product.

It is accordingly an object of this invention to provide a novel and economical method for the production of substantially anhydrous ketene.

Other objects of this invention will be apparent from the following detailed description and claims.

In accordance with the present invention, a gaseous mixture containing ketene and small amounts of water vapor is treated with a catalyst to effect a reaction between the water and a portion of the ketene. By means of this process, substantially all the water is removed very rapidly from the gaseous mixture so that the latter is ready for use in processes where anhydrous ketene is desired.

The gaseous mixture which is treated in accordance with the present invention may be obtained in any convenient manner. Thus, it may be obtained by subjecting an organic compound, such as acetic acid, to pyrolysis and thereafter cooling the resulting gaseous mixture, comprising ketene and water, to a temperature below its dew point, e. g. to a temperature of about 0° to 50° C. at atmospheric pressure, so that the cooled mixture will contain not more than about 5%, e. g. 2% to 4%, of water vapor. The pyrolysis of the acetic acid is advantageously carried out in the vapor phase at atmospheric, subatmospheric or superatmospheric pressure, at a temperature of about 600 to 800° C., in the presence of a suitable pyrolysis catalyst, such as a phosphate, e. g. diammonium phosphate, triethyl phosphate, tricresyl phosphate or other ester of phosphoric acid, the amount of catalyst being about 0.1 to 1.0%, preferably about 0.2 to 0.5% by weight based on the weight of the feed stock. In one convenient method of carrying out the pyrolysis reaction, vapors of the feed stock, e. g. acetic caid, and the catalyst are passed, at a pressure between atmospheric and 20 pounds per square inch gauge, through a reactor maintained at a temperature of about 625 to 750° C. or 800° C., and the resulting reaction mixture, after a reaction time of about 0.01 to 5.0 seconds, preferably about 0.5 to 3.0 seconds, is treated with a neutralizing agent such as ammonia, pyridine, aniline, or suitable aliphatic amines, which neutralizes the catalyst and retards recombination of the ketene with unreacted acetic acid and water of reaction. Preferably an excess of the neutralizing agent is employed. In certain cases the neutralization of the catalyst can be effected without the separate addition of a neutralizing agent. Thus, when the catalyst comprises a salt of a volatile base, such as ammonium phosphate, the neutralizing agent will be present inherently in the reaction mixture as it emerges from the reactor. In either event, the neutralized gases, which contian an amount of water about equal to or greater, on a molar basis, than the amount of ketene, are then cooled, e. g. to a temperature of about 50° C. As a result of the cooling, most of the water, acetic acid and acetic anhydride are removed as condensate and there is produced a gaseous mixture comprising ketene and small amounts of water, acetic acid and acetic anhydride.

As stated, the gaseous mixture comprising ketene and small amounts of water is treated with a catalyst, such as a phosphate catalyst, to effect a reaction between a portion of the ketene and the water. Suitable catalysts for this reaction are phosphate esters, such as triethyl phosphate, phosphoric acid and the like. Advantageously the reaction between a portion of the ketene and the water is carried out at a temperature of about 0° C. to 200° C., preferably about 0° C. to 50° C. The amount of catalyst may be varied widely, suitable proportions being about 0.01 to 10%, preferably about 0.2 to 0.5%, based on the weight of ketene. When the mixture of ketene and small amounts of water contains unreacted neutralizing agent, such as ammonia, an added portion of catalyst, sufficient to react with said neutralizing agent, should be employed.

The reaction between the ketene and the water produces acetic anhydride and acetic acid, the amount of such compounds so produced being proportional to the amount of water present in the gaseous mixture being treated. The acetic anhydride and acetic acid may be removed easily by vapor separators and may be recycled to the reactor used for producing the ketene. However, the acetic anhydride and acetic acid may be retained in the gaseous mixture if their presence is not undesirable. For example, the gaseous mixture produced by the reaction of the ketene and the small amount of water may be used directly, without further purification, for reaction with anhydrous formaldehyde in the presence of a Friedel-Crafts catalyst, such as zinc chloride, to produce beta-propiolactone, in a manner well known in the art.

The following example is given to illustrate this invention further.

Example

A stream of acetic acid containing 0.3% by weight of triethyl phosphate is passed continuously through a reaction zone maintained at a temperature of 1350 to 1450° F., at a rate such that the contact time in said zone is about one second, and then mixed with about 0.09% of its weight of ammonia. Thereafter the stream is cooled to a temperature of 110 to 120° F., whereupon about ⅔ of said stream condenses. After separation from the liquid condensate, the resulting stream of vapor, which contains about 92 mole percent of ketene, about 5 mole percent of water, and about 3 mole percent of acetic acid, is mixed with about 0.5% of triethyl phosphate, based on the weight of the ketene. The water present reacts with the ketene almost instantly. The stream is then passed through a suitable vapor separator to remove the liquids therefrom. The result is a water-free stream of ketene.

While the process of this invention has been described particularly in connection with ketene, as such, it may also be applied in the same manner to the treatment of water-containing mixtures comprising higher ketenes, e. g. aliphatic and aromatic ketenes such as methyl ketene or phenyl ketene.

It is to be understood that the foregoing detailed description is given merely by way of illustration and that many variations may be made therein without departing from the spirit of my invention.

Having described my invention, what I desire to secure by Letters Patent is:

1. Process for the production of a substantially anhydrous ketene, which comprises the steps of providing a gaseous aqueous mixture comprising a ketene and up to about 5% of water, and reacting substantially all of the water in said mixture with a portion of the ketene therein in the presence of a catalyst for said reaction.

2. Process for the production of substantially anhydrous ketene, which comprises the steps of providing a gaseous aqueous mixture comprising the ketene and up to about 5% of water and reacting substantially all of the water in said mixture with a portion of the ketene therein in the presence of a catalyst for said reaction.

3. Process for the production of a substantially anhydrous ketene, which comprises the steps of pyrolyzing a compound which breaks down to a ketene and water on heating, whereby to produce a gaseous mixture comprising said ketene and water, removing a portion of the water from said mixture to provide a gaseous mixture comprising ketene and a small amount of water, and then reacting substantially all of the water remaining in the latter mixture with a portion of the ketene therein in the presence of a catalyst for said reaction.

4. Process for the production of substantially anhydrous ketene, which comprises the steps of pyrolyzing a compound which breaks down to ketene and water on heating, whereby to produce a gaseous mixture comprising said ketene and water, removing a portion of the water from said mixture to provide a gaseous mixture comprising ketene and a small amount of water, and then reacting substantially all of the water remaining in the latter mixture with a portion of the ketene therein in the presence of a catalyst for said reaction.

5. Process for the production of substantially anhydrous ketene, which comprises the steps of pyrolyzing a compound which breaks down to ketene and water on heating in the presence of a catalyst for said pyrolysis, whereby to produce a hot gaseous mixture comprising said ketene, said catalyst, and water, neutralizing said catalyst, removing a portion of the water from the neutralized mixture by cooling to a temperature below its dew point to provide a gaseous mixture comprising ketene and a small amount of water and then reacting substantially all of the water remaining in the latter mixture with a portion of the ketene therein in the presence of a catalyst for said reaction.

6. Process as set forth in claim 2 in which the reaction is carried out at a temperature of 0 to 200° C.

7. Process as set forth in claim 2 in which the reaction is carried out at a temperature of about 0 to 50° C.

8. Process as set forth in claim 2 in which the catalyst is triethyl phosphate.

9. Process as set forth in claim 2 in which the catalyst is a phosphoric acid.

10. Process for the production of substantially anhydrous ketene, which comprises the steps of pyrolyzing a compound which breaks down to ketene and water on heating in the presence of a catalyst for said pyrolysis, whereby to produce a hot gaseous mixture comprising said ketene, said catalyst, and water, neutralizing said catalyst, removing a portion of the water from the neutralized mixture by cooling to leave up to 5% by weight of water in said mixture, and then reacting substantially all of the water remaining in said mixture with a portion of the ketene therein at a temperature of 0 to 200° C. in the presence of a catalyst for said reaction.

11. Process for the production of substantially anhydrous ketene, which comprises the steps of pyrolyzing a compound which breaks down to ketene and water on heating in the presence of a catalyst for said pyrolysis, whereby to produce a hot gaseous mixture comprising said ketene, said catalyst, and water, neutralizing said catalyst by the addition of ammonia to said hot gaseous mixture, removing a portion of the water from the neutralized mixture by cooling to leave up to 5% by weight of water in said mixture, and then reacting substantially all of the water remaining in said mixture with a portion of the ketene therein at a temperature of 0 to 200° C. in the presence of a catalyst for said reaction.

References Cited in the file of this patent
UNITED STATES PATENTS

| | | |
|---|---|---|
| 1,942,110 | Law | Jan. 2, 1934 |
| 2,019,983 | Law | Nov. 5, 1935 |
| 2,108,829 | Sixt et al. | Feb. 22, 1938 |